(12) United States Patent
de Queiroz et al.

(10) Patent No.: US 6,683,994 B1
(45) Date of Patent: Jan. 27, 2004

(54) HVQ-BASED FILTERING METHOD

(75) Inventors: Ricardo L. de Queiroz, Pittsford, NY (US); Patrick A. Fleckenstein, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 611 days.

(21) Appl. No.: 09/724,472

(22) Filed: Nov. 28, 2000

(51) Int. Cl.$^7$ ................................. G06K 9/40
(52) U.S. Cl. ........................ 382/260; 382/253
(58) Field of Search ................. 382/260, 261, 382/266, 253, 199, 224; 708/300, 304; 704/500

(56) References Cited

U.S. PATENT DOCUMENTS

| | | | |
|---|---|---|---|
| 5,455,899 A | 10/1995 | Forslund | 395/140 |
| 5,602,589 A | 2/1997 | Vishwanath et al. | 348/398 |
| 5,841,681 A * | 11/1998 | Chen et al. | 708/300 |
| 6,215,910 B1 * | 4/2001 | Chaddha | 382/253 |
| 6,563,955 B2 * | 5/2003 | de Queiroz | 382/239 |

FOREIGN PATENT DOCUMENTS

WO    WO 00/48341    8/2000

OTHER PUBLICATIONS

Cosman, Pamela C. et al., "Using Vector Quantization for Image Processing", Proceedings of the IEEE, IEEE, New York, vol. 81, No. 9, Sep. 1993.

* cited by examiner

Primary Examiner—Phuoc Tran
(74) Attorney, Agent, or Firm—Christopher D. Wait (57) ABSTRACT

A method for filtering digital data using techniques normally utilized for data compression prior to transmission or storage. These techniques include codebooks and codewords as found with vector quantization and the approach of using look-up tables as found in hierarchical vector quantization. The method described herein achieves exemplary filtering results by using the above techniques in an overlapping fashion rather than being directed in the usual manner so as to achieve data compression. The codewords thus generated by this series of overlapping look-up stages are approximations of the input data neighborhoods. The method achieves filtering by the processing and applying of a mapping function to these output codewords, thereby associating filter output values to the input digital data.

47 Claims, 5 Drawing Sheets

HVQ-BASED FILTERING METHOD

BACKGROUND OF THE INVENTION AND MATERIAL DISCLOSURE STATEMENT

The present invention relates to a methodology for filtering digital data. In particular the present invention is directed to the need for filtering ever larger amounts of data, in ever decreasing amounts of time, with greater economy and programmable flexibility. This need is particularly felt in the digital imaging arts and so will be described in terms of those problems. However, applicability will be found in other applications such as audio, video and communications for example.

In many signal processing areas, a filter whose cutoff frequency and rolloff characteristics can be programmed with high resolution is desired. Filtering tasks in audio systems include low-pass, band-pass and high-pass filters for program enhancement, surround sound level steering and crossover interfacing with speaker drivers. In video and digital image systems filters are employed for detecting, identifying and manipulating shape edges as well as obtaining average, edge and high frequency information. A problem particular to digital imaging is De-screening. De-screening is an important step performed on data right off an input scanner where the scanned material needs to be converted to gray scale images and any possible halftone contained in the scanned material needs to be "undone" to facilitate processing. This is desirable because the image system will apply its own halftone to the image data when displayed or output as a print. It is visually undesirable to further halftone a halftone. Common filtering tasks in communication systems include the minimizing of Inter-Symbol Interference (ISI) using Nyquist filters, the use of a matched filter (a filter with characteristics matched or complementary to characteristics of the signal applied to the communication channel) at the receiving end of a channel to maximize the receiver signal-to-noise ratio (SNR), and the attenuation of out-of-band interference. Changeable rolloff characteristics and frequency cutoff points allow the communication systems to operate over a variety of data rates and channel conditions.

The tasks of filtering and sampling analog signals can be done with various combinations of analog and digital filtering. A common technique is the use of a fixed analog filter with the desired frequency characteristics followed by a sampler on the analog filter output sampling at the desired sampling rate. Cost, flexibility, and performance considerations suggest the replacement of analog systems with systems or devices employing digital signal processing (DSP) techniques, particularly where programmable flexibility is desired.

One DSP technique utilized most typically in image processing operations is known as vector quantization (VQ). In VQ a block of X×Y pixels is mapped to a single "codeword" which is defined using a smaller number of bits than the number required by the original block. Codewords are stored in transmitting, receiving and storage devices, and each codeword is associated with a pre-defined set of image data. The codeword to which each pixel block is mapped, is that codeword which is associated with image data that most closely matches the image data in the pixel block. The typical process includes mapping the pixel block to a codeword, storing the codeword or transmitting it to a receiving device, and then mapping the codeword back to image data when it is retrieved from storage or received at the receiving device. Since codebook storage and codeword transmission require less space and time than storage and transmission of original image data, this process greatly reduces the resources required to reproduce the original image data.

There are typically many more combinations of pixel blocks than there are available codewords, and as indicated by the term "quantization" several input blocks will be mapped to the same single given codeword. For a fixed number of codewords, increasing the size of the pixel block reduces the quality of mapping and reconstruction since a lot more of the actual image data must be mapped to the same number of codewords. Some drawbacks of VQ are that codebook design is often very complex, and that large amounts of time are usually required to search through the codebook and to match blocks to the appropriate codeword. While codebook design can be performed off-line, the block matching searches must be performed on-line.

In hierarchical vector quantization (HVQ), block matching searches are performed two samples at a time. Thus, look up tables (LUTs) can be used directly to perform HVQ in two or more stages. In the first stage, two image pixels are mapped to one codeword, reducing the number of samples by a factor of 2. In the next stage, the process is repeated to map pairs of codewords into single codewords. Preferably, codewords are grouped in a direction perpendicular to the direction used for the previous level. As the process continues, the resulting codewords are mapped to larger and larger amounts of data.

HVQ allows for a rough approximation of the content of each image block by using simple look-up table operations. The final codeword represents a block approximation and can therefore be directly mapped to other quantities which describe certain characteristics of the approximated block, such as block activity. HVQ codebook design methods follow standard VQ codebook design algorithms and are usually performed by designing the codebooks for a single stage at a time. However there remains a need for further improvement in efficiently processing digital data (image data in particular) and allowing improved digital filtering without affecting the transmission efficiency in serial data transmission systems.

The following appears to be relevant to manipulation and compression of data. It is incorporated by reference in its entirety for its teaching.

In U.S. Pat. No. 5,602,589 to Vishwanath et al., a weighted wavelet hierarchical vector quantization (WWHVQ) procedure is initiated by obtaining an N×N pixel image where 8 bits per pixel (steps 10 and 12). A look-up operation is performed to obtain data representing a discrete wavelet transform (DWT) followed by a quantization of the data (step 14). Upon completion of the look-up, a data compression will have been performed. Further stages and look-up will result in further compression of the data, i.e., 4:1, 8:1, 16:1, 32:1, 64:1, . . . etc. Accordingly, a determination is made whether the compression is complete (step 16). If the compression is incomplete, further look-up is performed. If the compression is complete, however, the compressed data is transmitted (step 18). It is determined at a gateway whether further compression is required (step 19). If so, transcoding is performed (step 20). The receiver receives the compressed data (step 22). Subsequently, a second look-up operation is performed to obtain data representing an inverse discrete wavelet transform of the decompressed data (step 24). After one iteration, the data is decompressed by a factor of two. Further iterations allows for further decompression of the data. Accordingly, a determination is made whether decompression is complete (step 26). If the decompression is in incomplete, further look-ups are performed. If, however, the decompression is complete, the WWHVQ procedure is ended.

Therefore, as discussed above there exists a need for a technique which will solve the problem of filtering large amounts of digital signal data in a cost effective and flexibly programmable manner. Thus, it would be desirable to solve this and other deficiencies and disadvantages with an improved processing methodology.

SUMMARY OF THE INVENTION

The present invention relates to a method of filtering data, comprising receiving input data comprised of data units and applying at least two stages of look-up-tables in an overlapping manner to the data units so as to produce a code index for each data unit. This code index is then mapped the to a filter look-up-table to output a processed data unit.

More particularly, the present invention relates to a method of filtering data, comprising receiving input data comprised of data units and applying the data units as pairs to a first stage of look-up-tables so as to produce pairs of first stage results. This is then followed by regrouping the pairs of first stage results into overlapping pairs and applying the overlapping pairs to a second stage of look-up-tables so as to produce a code index for each data unit. This code index is then mapped the to a filter look-up-table to output a processed data unit.

DESCRIPTION OF THE INVENTION

Vector quantization is a well known technique for compressing video, image or other digital data for transmission or storage. With image vector quantization (VQ), a block of n×m pixels is mapped to a single "codeword" which is then transmitted and used to reconstruct the block. Typically there are many more combinations of blocks than there are codewords available and several input blocks can be mapped to a single codeword (thus the term quantization). The collection of codewords composes the "codebook", each codeword mapping directly into one block of n×m pixels. Clearly, for a fixed number of codewords, the larger the block size the worse the mapping and reconstruction quality.

VQ may be further described as a technique in which K symbols that have N bits each are assigned to a single B bit codeword, where B<NK. For example eight, eight-bit input strings might be assigned to a twelve-bit codeword. Thus, in this example, there will be enough codewords to represent only the 4096 ($2^{12}$) most representative blocks of the sixteen input symbols. Codewords that are produced by vector coding are usually stored or transmitted to another location or device, and are later decoded—mapped back—to K symbols. The drawbacks of VQ are: codebook design (very complex, but can be done off-line) and block matching searches (which have to be done on-line, thereby slowing system response).

Figure 1:
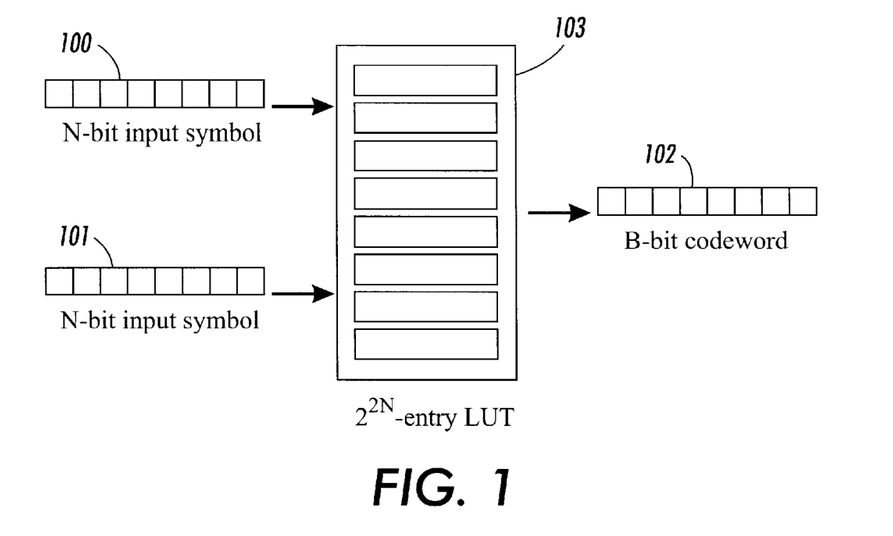
FIG. 1 depicts a block diagram of codeword generation.
Figure 2:
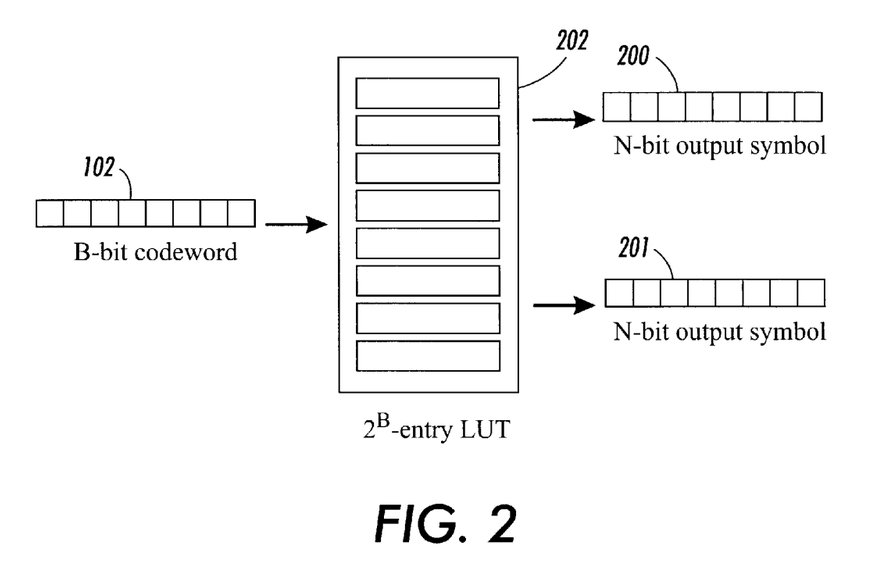
FIG. 2 depicts a block diagram of codeword decoding.
Figure 3:
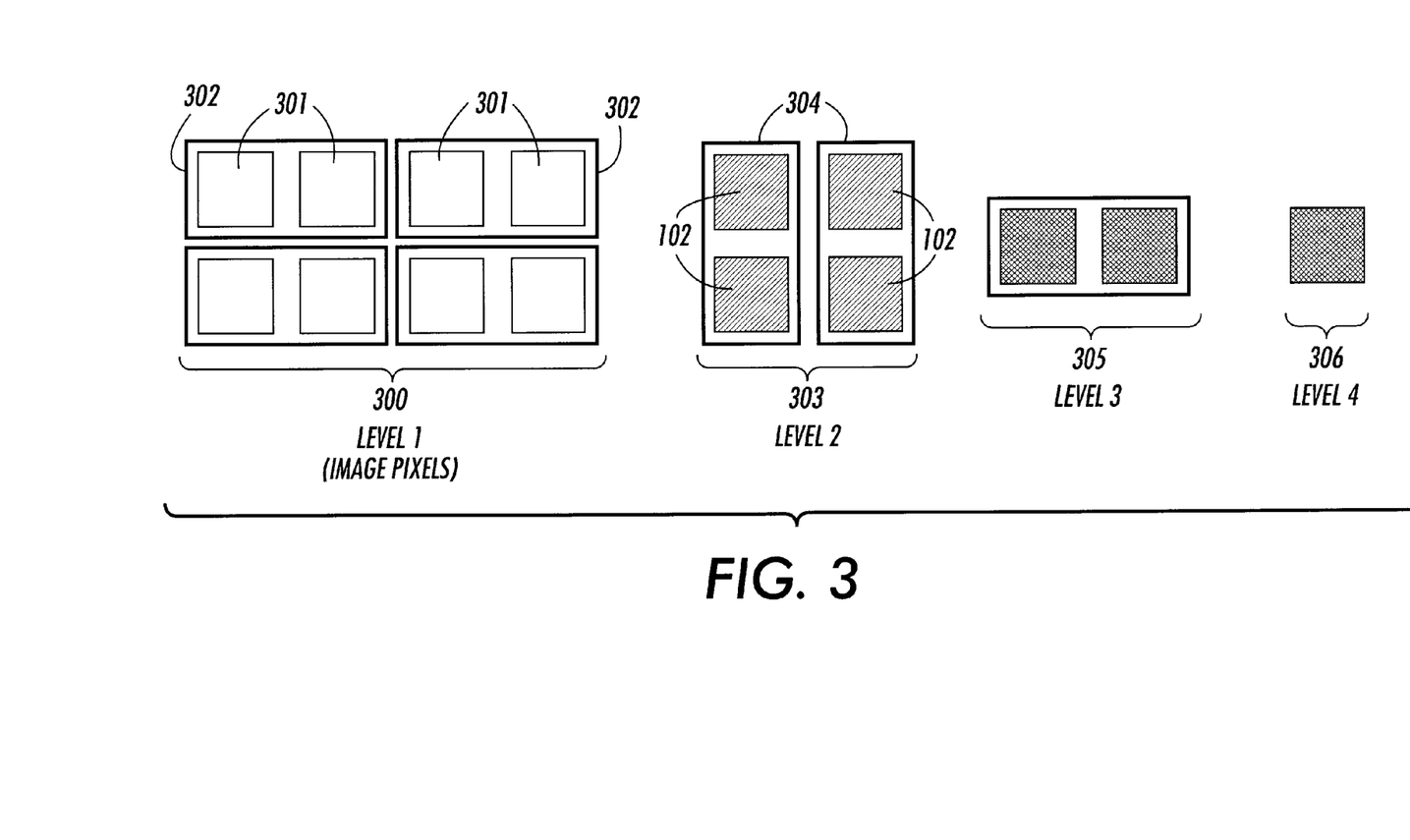
FIG. 3 shows two dimensional data reduction.

Hierarchical VQ (HVQ) overcomes the drawback of block matching searches involved in VQ. In HVQ, the search is done two samples at a time. Thus, look-up tables (LUT's) can be directly used. FIG. 1 depicts the process, in which two n-bit symbols 100 and 101 are mapped to a B-bit code-word 102 via LUT 1–3. The reconstruction, i.e. mapping from the code-word 102 to symbols 200 and 201 is obtained by another LUT 202 as shown in FIG. 2. This technique is used in a recursive manner as depicted in FIG. 3. Please note that this example as shown in FIG. 3 is a two dimensional solution (as opposed to a one dimensional solution) and thus a preferred approach when dealing with image data. By two dimensional we mean that the data reduction/quantization alternates between vertical or horizontal reduction. At the first and initial level 300 there are original pixels 301 which are grouped into horizontal pairs as indicated by box 302. Each pair of image pixels 301 are mapped to a code-word 102 reducing the number of samples by a factor of two and as now depicted in the second level 303. In this next level 303, the process is repeated, preferably grouping codewords in a direction perpendicular to the one used for the previous level as shown by outline box 304. In this example that means outline box 304 is arranged vertically. As the process is repeated in third and forth levels 305 and 306 respectively, the resulting code-word is effectively a map of ever larger and larger blocks of pixel data. While four levels are shown here, the number of levels required depends on the amount of quantization and amount of data compression desired.

Figure 4:
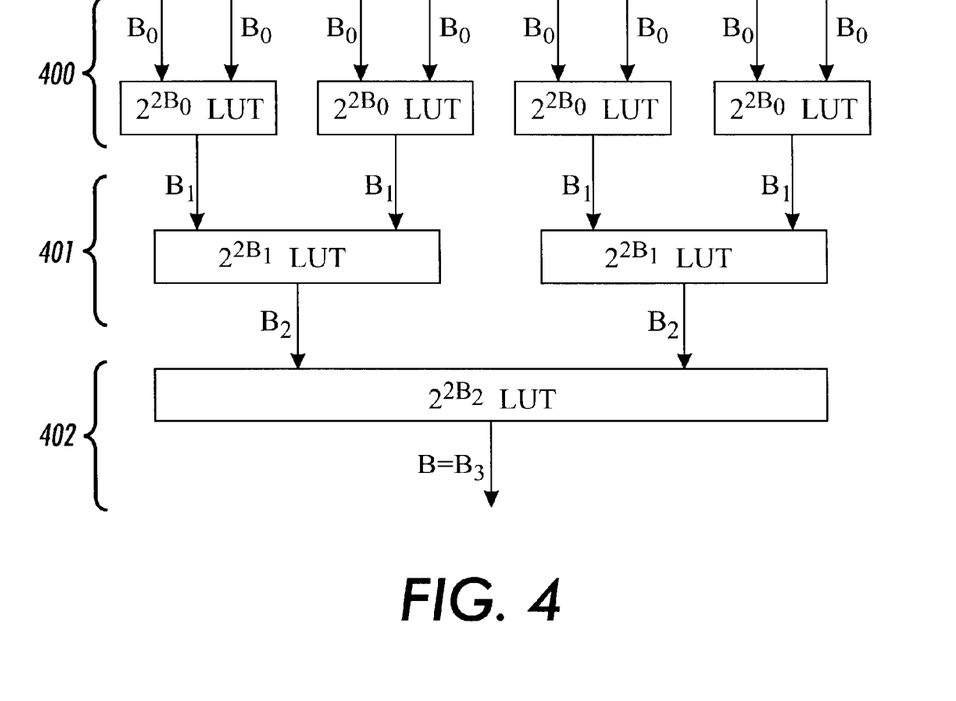
FIG. 4 shows a three layer HVQ system.

FIG. 4 illustrates a diagram of an HVQ system for vector quantizing an 8-sample vector of B0-bits each, into one B-bit coded data. There are 3 layers of LUTs depicted in FIG. 4, layer 400, layer 401 and layer 402. Each of these LUTs accepts two $B_n$-bit input data samples and outputs one $B_{n+1}$-bit number result. The original vector is broken into pairs of samples which are fed into the first layer 400 of LUTs. Since each sample has B0 bits, the LUTs in the first layer need to accommodate $2^{2B0}$ entries of B1 bits each. The output of the first stage 400 is a vector of four B1-bit samples, since there were four pairs of samples in the original vector. Put simply, the number of numbers was halved. The B1-bit numbers are grouped into two pairs and fed into the second stage 401 which contains LUTs to accommodate $2^{2B1}$ entries of B2 bits each. Finally there are two numbers of B2 bits each which are output from the second stage 401 and this pair is fed into the last LUT 402 which contains $2^{2B2}$ entries of B3 bits each, resulting into a single output number of B3=B bits. Commonly, all LUTs in one stage are the same but LUTs at different stages have different contents. The data used to fill all the LUTs involved is commonly found through the codebook design of HVQ. Such HVQ codebook design (and hence LUT design) is well understood by those skilled in the art. The first stage of LUTs may also be designed by using classical VQ design techniques, an example of which is the LBG (Linde-Buzo-Gray) algorithm. The text "Vector Quantization and Signal Compression", by A. Gersho and R. Gray, Kluwer published by Academic, 1992, and incorporated herein by reference in its entirety for its teaching, serves as a common reference on the design techniques for the various VQ systems. The subsequent stages of the HVQ design may also use algorithms such as LBG to further quantize the finite pre-quantized input data into higher dimensions (larger vectors).

One can generalize HVQ then for K stages for a vector of $2_K$ samples as hierarchically submitted to a sequence of K LUT stages until one B-bit sample is output at the final stage. One can also extend HVQ for image processing to a two dimensional case in which samples can be grouped in pairs alternating the horizontal and vertical directions. An illustration of such a sequence for 3 stages of HVQ applied to an image block of 8 pixels was shown in FIG. 3 and discussed above.

Figure 5:
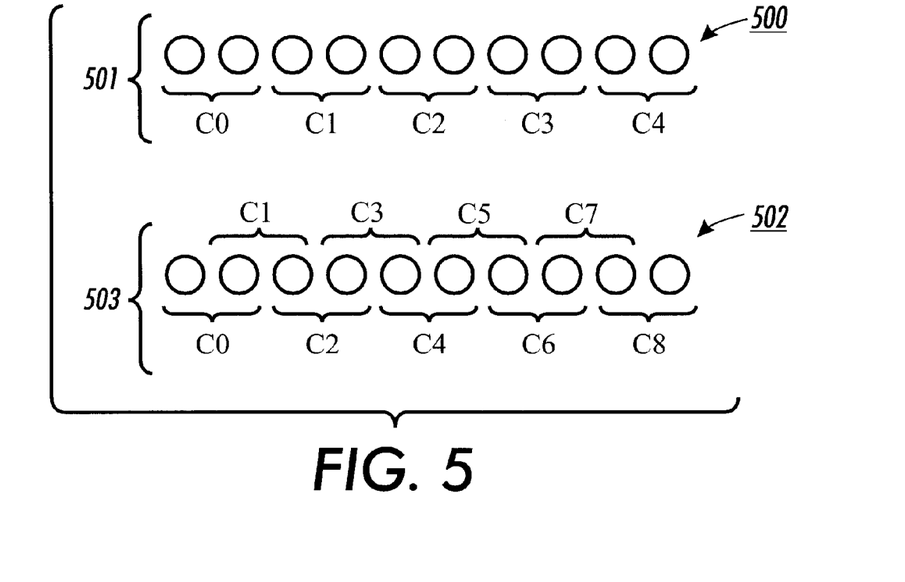
FIG. 5 shows a comparison of HVQ to Overlapped HVQ.

An exemplary methodology provided herein is to apply overlapping HVQ (OHVQ) to the data so as to provide filtered results as opposed to providing compressed data or quantization as a result. With the present invention the amount of data is not reduced, rather the amount of data remains the same or essentially the same. FIG. 5 depicts this in some simplicity. HVQ applied to a sample string of data of ten samples or data units 500 as shown in layer 501 yields five results C0, C1, C2, C3, and C4. However, when OHVQ is applied to the same amount of data units as depicted in layer 503 the results are C0, C1, C2, C3, C4, C5, C6, C7, and C8.

Figure 6:
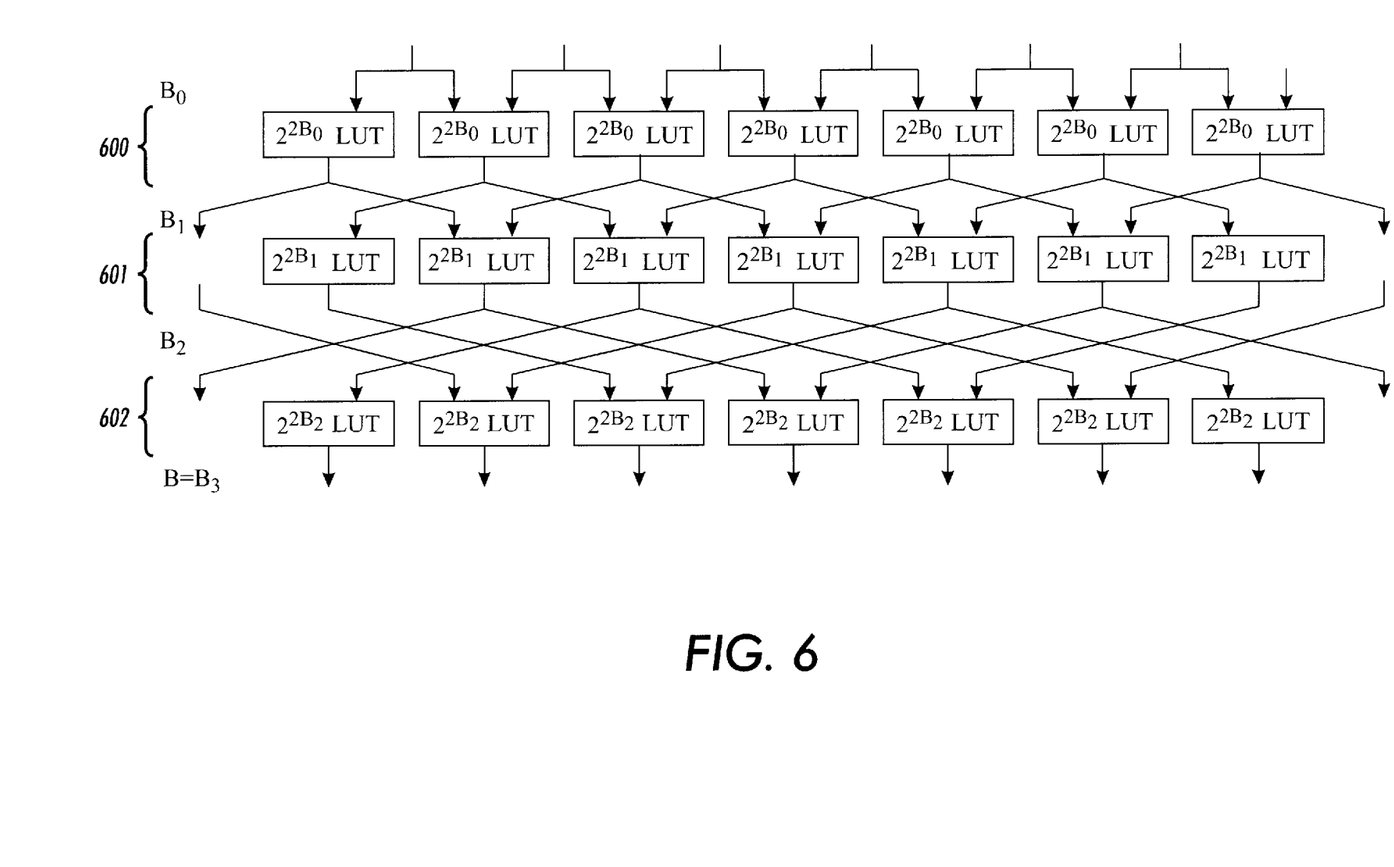
FIG. 6 depicts a three layer OHVQ system.

An overlapped HVQ (OHVQ) system is depicted in FIG. 6. As found with the system depicted in FIG. 1, there are 3 stages of LUTs 600, 601 and 602. Also similar when comparing the HVQ system as shown in FIG. 4, to the OHVQ system in FIG. 6, is that there are the same number of input and output bits (or units) at each stage. The main difference between HVQ and OHVQ is that in the OHVQ case, the same relative number of input samples (or input units) are maintained as output. However, the output units are now representative of the neighborhood of the input sample. So to build an OHVQ from HVQ, the HVQ system is modified at each stage by grouping the numbers into overlapping pairs. Every output number/sample at stages 600 and 601 in FIG. 6 is connected to two different LUTs in the following stage. The exception being the first and last outputs from stage 600. For the example depicted in FIG. 6, this data is just passed directly through stage 601 (with the requisite stage delay time). In an alternative approach the first and last outputs may be paired together as input to an additional LUT. These extra connections as shown in FIG. 6 for OHVQ create a redundancy which maintains the number of samples for each stage. The design otherwise is the same as used when designing HVQ tables. The last stage 602 produces a code index which reflects the input unit neighborhood. Where more stages in a HVQ system reduce the amount of data, in an OHVQ system more stages increase the amount of overlap. Greater overlap broadens the size of the neighborhood information reflected in the code index thereby generated.

In HVQ the final codeword or code index represents a vector which approximates the original input vector. There is one codeword per vector. In an OHVQ system each codeword represents a vector. The vectors for each codeword overlap and in essence, each resultant codeword or code index represents an approximation of a region or neighborhood in the original signal sequence. If there are B-bit codewords output, there are $2^B$ codewords to represent all the universe of $2^{NB}$ possible input combinations. Hence, each codeword is set to correspond to a representative vector. This representative vector is a good approximation of the input data and can be used to replace it if necessary.

Figure 7:
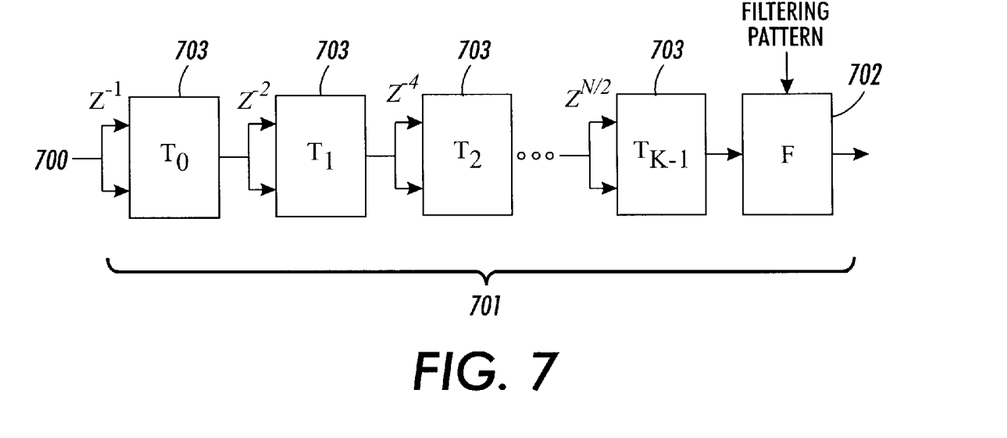
FIG. 7 shows a block diagram for a one dimensional OHVQ system.

The present invention is directed towards implementing a LUT based signal processing unit. We now turn our attention to FIG. 7. FIG. 7 depicts an embodiment of the proposed invention wherein an input sample 700 is fed to K stages of tables $T_0$ through $T_{K-1}$ 701. Each $T_n$ of the stages 701 is a simple LUT. This can be viewed as a clocked system wherein at each clock signal, one sample of data is input and another is output. The elements $Z^{-n}$ 703 represent delays, i.e. the data should be retrieved from the data used there n clock cycles ago. This delay accounts for the data shuffling in between stages 701 in FIG. 6. After the last stage, $T_{K-1}$, there is another LUT stage F 702. Table F 702 maps one-to-one the codeword output by stage $T_{K-1}$ to a signal sample. In this way table F 702 acts as a filter on the codewords generated by $T_{K-1}$.

It will be apparent to those skilled in the art, that since stages $T_{K-1}$ and table F 702 are directly interconnected, the codewords in $T_{K-1}$ are redundant and can be removed, being replaced directly by the respective contents of table F 702.

In a preferred embodiment of the proposed invention the entries of the LUTs $T_n$ 701 are designed according HVQ methods. In HVQ design, LUT contents are designed based on input data and on the set of practical restrictions of data sizes or data units indicated by the number of bits used in every stage $B_n$. Still according to HVQ design, each output codeword at every stage is associated with a reconstruction vector. This vector, will have a size of $N=2^K$, wherein K is the number of LUT stages. It is well understood for those skilled in the art of VQ that each codeword maps to an approximation of the input vector. However, in the OHVQ case, each input sample generates an output codeword, and said codeword maps to vectors which approximate the spatial neighborhood of the said input sample 700.

The present invention is based on OHVQ and the logic for F 702 is the following. If the codewords can be mapped to representative vectors, one can retrieve said vectors and process them on the fly producing an output of processed data, wherein the data processed is limited by the spectrum of vectors available in your codebook. However, instead of processing or filtering the vectors on the fly, since there is a finite number of such vectors, one can process the vectors offline (using LBG in a preferred embodiment for example) and pre-store the resulting output number into F 702. Hence, table F 702 acts as a filter by mapping codeword indices directly to an output number, as if a filter was applied to the representative vectors.

In a preferred embodiment of the proposed invention, the contents of table F 702 represent linear spatial filtering operations applied to the set of representative vectors. An example of a spatial filter is the weighted sum of the vector's entries.

In another preferred embodiment of the proposed invention, the contents of table F 702 represent non-linear spatial filtering operations applied to the set of representative vectors. Examples of a non-linear spatial filters are not limited to: (a) the weighted sum of the vector entries which fall within a certain value distance from the value of a given sample (e.g. the center sample); (b) dynamic range (maximum value minus the minimum value) of all vector entries; (c) variance or standard deviation of the vector; (d) other statistical measures of the vector's entries.

In another preferred embodiment of the proposed invention, the contents of table F 702 represent classification of the representative vectors according to some rule. Examples of classification labels in a typical document image are: edges, graphics, background, picture, texture, to name a few.

Figure 8:
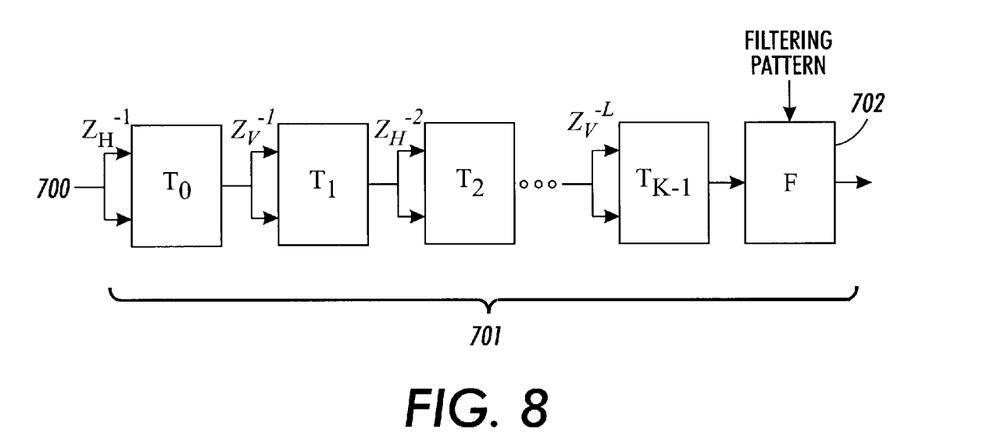
FIG. 8 shows a block diagram for a two dimensional OHVQ system.

It will be apparent for those skilled in the art that most of the descriptions made so far were applied to one dimensional systems and signals for simplicity and that therefore extension to higher dimensional signals and systems is trivial. In a preferred embodiment of the proposed invention, the input data is a two dimensional set of image pixels. Hence, a preferred embodiment of the invention the proposed association of OHVQ LUTs follows the two dimensional HVQ scheme found in FIG. 3. To be specific, the diagram in FIG. 7 is replaced by the diagram shown in FIG. 8, wherein the labels $Z_V^{-n}$ and $Z_H^{-n}$ represent delays of n samples vertically and horizontally, respectively. Each stage of the LUTs are arranged as pairs, one for the horizontal direction and another for the vertical direction. The sequence for delay operators in FIG. 8 is: $Z_H^{-1}$ $Z_V^{-1}$ $Z_H^{-2}$ $Z_V^{-2}$ $Z_H^{-4}$ $Z_V^{-4}$ $Z_H^{-8}$ $Z_V^{-8}$ etc.

It will be appreciated by those skilled in the art that in this invention the LUT based filter is generic in terms of its implementation. The diagrams in FIGS. 7 and 8 are not concerned with the application of the filter. What is important is that the contents of LUT F 702 can be changed from application to application. So, according to yet another embodiment of the present invention, there is provided a means for switching the contents of F 702 during the filter operation. For this table F 702 can be viewed as a pointer to a position in memory wherein the LUT entries are stored. If one stores several LUT entries for different filter operations at different memory locations, the switching mechanism can be simply to change the pointer to another memory position.

It should be appreciated that the proposed invention is not only flexible for being able to implement a plurality of image processing algorithms using a single apparatus, but it is also efficient in terms of implementation. Complex operations such statistical analysis of the block/vector can be done with a simple set of tables. That reflects in an economical implementation of a series of image processing algorithms.

While the embodiment disclosed herein is preferred, it will be appreciated from this teaching that various alternative, modifications, variations or improvements therein may be made by those skilled in the art, which are intended to be encompassed by the following claims.

What is claimed is:

1. A method of filtering data, comprising:
    receiving input data comprised of data units;
    applying at least two stages of look-up-tables in an overlapping manner to the data units so as to produce a code index for each data unit; and,
    mapping the code index to a filter look-up-table to output a processed data unit.

2. The method of claim 1 wherein the step of applying at least two stages of look-up-tables utilizes HVQ techniques.

3. The method of claim 2 wherein the at least two stages of look-up-tables are designed utilizing vector quantization design techniques.

4. The method of claim 3 wherein the at least two stages of look-up-tables are designed utilizing LBG algorithm techniques.

5. The method of claim 4 wherein the input data is digital audio data.

6. The method of claim 4 wherein the input data is digital image data.

7. The method of claim 4 wherein the filter look-up-table contents represent a linear spatial filtering when mapped to the code index.

8. The method of claim 4 wherein the filter look-up-table contents represent a non-linear spatial filtering when mapped to the code index.

9. The method of claim 8 wherein the non-linear spatial filtering yields a weighted sum of the data units.

10. The method of claim 8 wherein the non-linear spatial filtering yields a dynamic range of the data units.

11. The method of claim 8 wherein the non-linear spatial filtering yields a variance of the data units.

12. The method of claim 6 wherein the filter look-up-table contents represent a classification of the data units when mapped to the code index.

13. The method of claim 12 wherein the classification is for indicating edges.

14. The method of claim 12 wherein the classification is for indicating texture.

15. The method of claim 12 wherein the classification is for indicating background.

16. The method of claim 12 wherein the classification is for indicating halftoning.

17. The method of claim 4 wherein the filter look-up-table contents may be switched during operation to achieve alternative filter operations.

18. The method of claim 4 wherein the filter look-up-table further includes a pointer to alternative contents in the filter look-up-table, the pointer being switchable during operation to achieve alternative filter operations.

19. The method of claim 4 wherein the input data is one dimensional.

20. The method of claim 4 wherein the input data is two dimensional.

21. The method of claim 4 wherein the input data is multi dimensional.

22. A method of filtering data, comprising:
    receiving input data comprised of data units;
    applying data units as pairs to a first stage look-up-table so as to produce pairs of first stage results;
    regrouping the pairs of first stage results into overlapping pairs;
    applying the overlapping pairs to a second stage look-up-table so as to produce a code index for each data unit; and,
    mapping the code index to a filter look-up-table to output a processed data unit.

23. The method of claim 22 wherein the first stage of look-up-tables and the second stage of look-up-tables are designed utilizing vector quantization design techniques.

24. The method of claim 23 wherein the first stage of look-up-tables and the second stage of look-up-tables are designed utilizing LBG algorithm techniques.

25. The method of claim 24 wherein the input data is digital audio data.

26. The method of claim 24 wherein the input data is digital image data.

27. The method of claim 24 wherein the filter look-up-table contents represent a linear spatial filtering when mapped to the code index.

28. The method of claim 24 wherein the filter look-up-table contents represent a non-linear spatial filtering when mapped to the code index.

29. The method of claim 28 wherein the non-linear spatial filtering yields a weighted sum of the data units.

30. The method of claim 28 wherein the non-linear spatial filtering yields a dynamic range of the data units.

31. The method of claim 28 wherein the non-linear spatial filtering yields a variance of the data units.

32. The method of claim 24 wherein the filter look-up-table contents represent a classification of the data units when mapped to the code index.

33. The method of claim 32 wherein the classification is for indicating edges.

34. The method of claim 32 wherein the classification is for indicating texture.

35. The method of claim 32 wherein the classification is for indicating background.

36. The method of claim 32 wherein the classification is for indicating halftoning.

37. The method of claim 24 wherein the input data is one dimensional.

38. The method of claim 24 wherein the input data is two dimensional.

39. The method of claim 24 wherein the input data is multi dimensional.

40. A method of filtering two dimensional image data, comprising:

receiving input data comprised of image pixels which are treated as code indices;

applying pairs of code indices, where the pairing is arranged in the horizontal, to a horizontal stage look-up table to produce intermediary code indices;

applying pairs of intermediary code indices, where the pairing is arranged in the vertical, to a vertical stage look-up table to produce resulting code indices; and, mapping the resulting code indices to a filter look-up-table to output filtered image pixels.

41. The method of claim 40 wherein the pair of code indices are chosen according to two dimensional overlapped HVQ techniques.

42. The method of claim 41 wherein the horizontal and vertical stage look-up tables are designed utilizing vector quantization design techniques.

43. The method of claim 42 wherein the vector quantization design technique utilized is the LBG algorithm.

44. The method of claim 40 wherein prior to the step of mapping, another iteration through the horizontal and vertical stage look-up tables is performed, the steps comprising:

applying pairs of resulting code indices, where the pairing is arranged in the horizontal, to the horizontal stage look-up table to produce further intermediary code indices;

applying pairs of further intermediary code indices, where the pairing is arranged in the vertical, to the vertical stage look-up table to produce further resulting code indices; and, mapping the further resulting code indices to the filter look-up-table to output filtered image pixels.

45. The method of claim 44 wherein the pair of code indices are chosen according to two dimensional overlapped HVQ techniques.

46. The method of claim 45 wherein the horizontal and vertical stage look-up tables are designed utilizing vector quantization design techniques.

47. The method of claim 46 wherein the vector quantization design technique utilized is the LBG algorithm.

\* \* \* \* \*